United States Patent [19]

Seligman

[11] Patent Number: 4,676,005
[45] Date of Patent: Jun. 30, 1987

[54] WEDDING CAKE TIER ALIGNER

[76] Inventor: Arnold D. Seligman, 4726 Brownsboro Rd., Louisville, Ky. 40207

[21] Appl. No.: 869,627

[22] Filed: Jun. 2, 1986

[51] Int. Cl.$^4$ ............................................. G01B 5/25
[52] U.S. Cl. ...................................... 33/533; 33/525; 33/1 F; 33/613
[58] Field of Search ............. 33/1 F, 1 N, 525, 180 R, 33/1 R, 1 G, 1 CC, 524, 533

[56] References Cited

U.S. PATENT DOCUMENTS

| 681,551 | 8/1901 | Hulse et al. | 33/525 |
| 2,836,892 | 6/1958 | Nisenson | 33/1 N |
| 2,960,770 | 11/1960 | Valenta | 33/1 F |
| 3,075,565 | 1/1963 | Weaver et al. | 33/525 |
| 3,477,135 | 11/1969 | Haapala | 33/525 |
| 4,100,676 | 7/1978 | Ferguson | 33/525 |

FOREIGN PATENT DOCUMENTS 552588 11/1956 Belgium ............................... 33/1 F Primary Examiner—William D. Martin, Jr.
Attorney, Agent, or Firm—Richard L. Caslin

[57] ABSTRACT

The design of a geometric instrument which is used during the construction of the various cake layers or tiers of the wedding cake so that each cake layer is centered on a common vertical centerline, and both the support posts that are embedded in each layer of the cake, as well as the ornamental support posts, are positioned on two diametrical lines that are perpendicular to each other. This cake tier aligner has a lower pair of parallel support rails, a vertical column rising at one end of the lower rails and an upper pair of parallel guide rails supported from the upper end of the vertical column directly over and generally parallel to the lower support rails. The lower support rails include side stabilizing means, and the upper guide rails include measured indicia. There is a separate centering platform for supporting a cake layer above the lower support rails of the aligner. This centering platform includes a diagonal indexing means on its underside which slips between the lower support rails. The centering platform also has stabilizing support means on its underside to support the platform from a support surface independent of the cake tier aligner. The upper surface of the platform includes two series of depressions arranged diagonally of the platform that are generally perpendicular to each other.

13 Claims, 7 Drawing Figures

WEDDING CAKE TIER ALIGNER

BACKGROUND OF THE INVENTION

1. Field of the Invention

This invention relates to the art and method employed by bakers in assembling multiple tier wedding cakes when the several tiers are separated from the next lower tier as well as the next upper tier by means of ornamental posts. The invention relates to a geometric instrument that is used by bakers and wedding cake decorators in aligning the vertical supporting posts that are embedded in each layer of the cake so that such vertical supporting posts at the various tiers are arranged on common perpendicular diagonal lines as seen in top plan view of the completed cake.

2. Description of Prior Art

A thorough search of the prior are has been conducted and no anticipatory prior art has been discovered.

The Vaca U.S. Pat. No. 4,227,484 describes a cake frosting device having a pedestal which supports a cake platter. Vertical pins are movable upwardly through apertures to impale cake layers thereon. The layer is thereby effectively anchored on the platter to enable icing to be applied to the layer by a spatula without fear of pushing the cake off the platter.

The Lindquist U.S. Pat. No. 3,420,210 describes a cake ornamental flower spinner. A base supports a 3-speed electric motor for driving a vertical shaft of a large turntable. The turntable includes prongs that engage the bottom surface of the layer of cake to retain the layer in position. The flower spinner assembly includes a pair of vertical support shafts that support a pair of discs for rotation therewith by means of a belt drive. These discs represent small turntable portions that are adapted to have flowers of icing formed thereon as they are rotated at low speed, after which the ornamental flowers of icing may be removed from the small turntable means and placed upon the cake supported on the larger turntable.

OBJECTS OF THE PRESENT INVENTION

The principal object of the present invention is to provide the combination of a wedding cake tier aligner and a separate centering platform for use in arranging the cake layers on a common central vertical axis.

A further object of the present invention is to provide a combination aligner and platform of the class described where the aligner is a geometric instrument that is capable of sliding under the platform and over the platform so as to position support posts fastened to a cake layer supporting plate relative to the cake layer before the support posts are forced to penetrate down into the cake layer.

SUMMARY OF THE INVENTION

The present invention comprises the combination of a cake tier aligner and a separate centering platform. The cake tier aligner has a lower pair of parallel support rails with a vertical column rising at one end of these rails. The upper end of the vertical column supports an upper pair of parallel guide rails that are arranged directly over and generally parallel to the lower support rails. These lower support rails also include side stabilizing means. A centering platform for supporting a cake layer is of generally flat circular shape, and it has a diagonal indexing means on its underside which slips between the lower support rails when the platform is positioned over the lower support rails. The upper surface of the platform has two series of depressions formed in the platform and arranged diagonally thereof, where one series of depressions is arranged over the diagonal indexing means, while the second series of depressions is arranged perpendicular to the first series.

BRIEF DESCRIPTION OF THE DRAWINGS

This invention will be better understood from the following description taken in conjunction with the accompanying drawings, and its scope will be pointed out in the appended claims.

DESCRIPTION OF THE PREFERRED EMBODIMENTS

Figure 1:
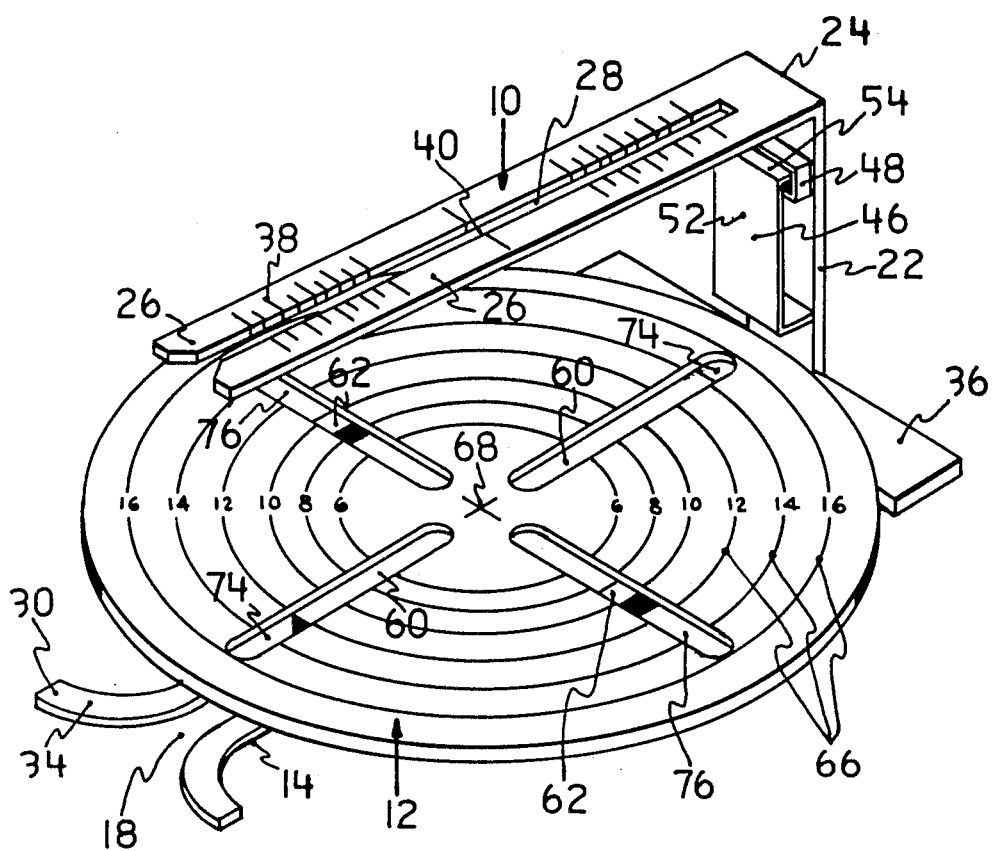
FIG. 1 is a perspective view of the cake tier aligner of the present invention supporting the centering platform therein.

Turning now to a consideration of the drawings and, in particular, to the top prespective view of FIG. 1, there is shown a cake tier aligner 10 in the from of a geometric instrument which cooperates with a centering platform 12 so that a wedding cake decorator may assemble the cake layers in multiple tiers of a common vertical centerline.

Figure 3:
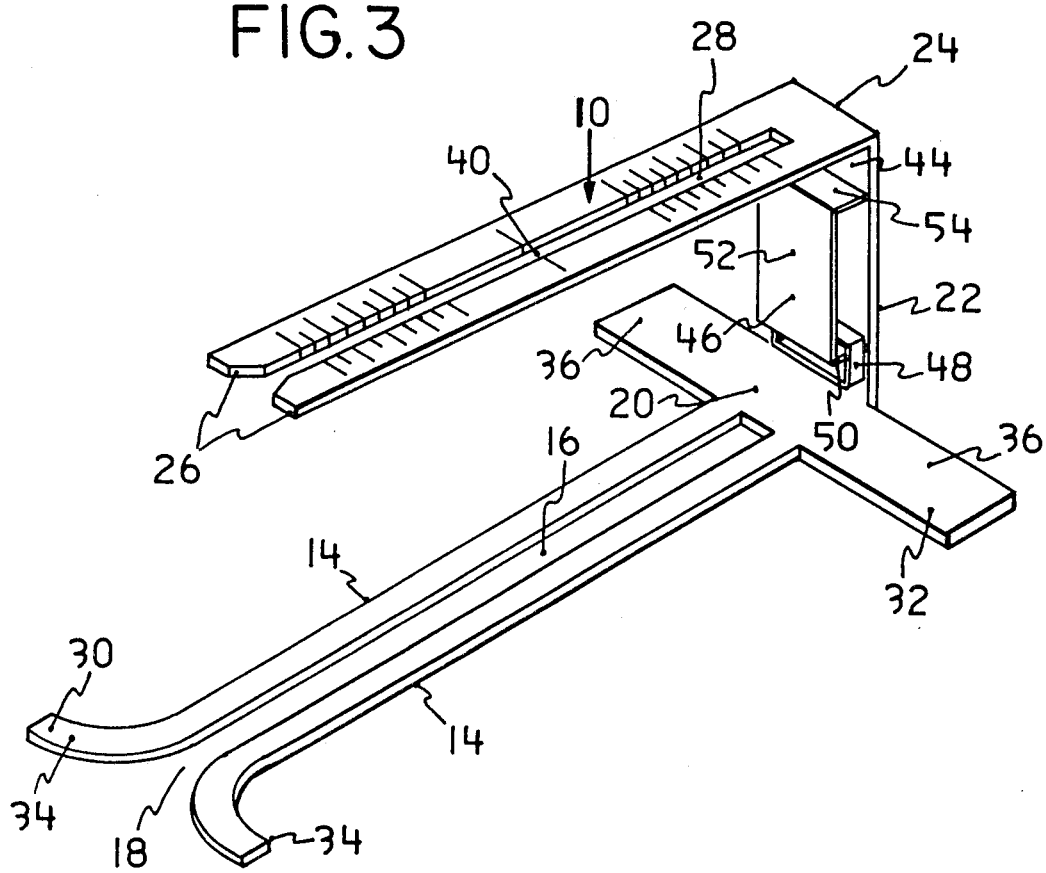
FIG. 3 is a perspective view of the cake tier aligner similar to that of FIG. 1 but with the centering platform removed so as to illustrate the geometric construction of the aligner.

The nature of the cake tier aligner 10 can be best understood in FIG. 3 where the aligner stands alone with the centering platform 12 of FIG. 1 removed. The cake tier aligner 10 has a lower pair of parallel support rails 14 which are closely spaced from each other to provide an elongated slot 16. This elongated slot 16 is open at one end 18 and closed at the other end 20. The closed end 20 of the lower support rails 14 include a vertical column 22. The upper end 24 of the vertical column supports an upper pair of parallel guide rails 26. This upper pair of guide rails 26 is arranged directly over and generally parallel to the lower support rails 14. Also, this upper pair of parallel guide rails 26 is closely spaced to each other to form an elongated slot 28.

The lower support rails 14 are provided with side stabilizing means 30 and 32. Stabilizing means 30 are reresented by outwardly tapered rail ends 34 which are located near the open end 18 of the elongated slot 16. The side stabilizing means 32 at the opposite ends of the lower support rails 14 is represented by a pair of horizontal extensions 36 which serve as outriggers and cooperate with the tapered ends 34 to discourage the aligner 10 from tipping over to the side.

The upper pair of parallel guide rails 26 is provided with measured indicia 38, and this indicia is measured from an imaginary center 40 which coincides with the vertical center axis of the wedding cake.

The innermost side 44 of the support column 22 is provided with offset measuring means 46 and 48 that assist in centering a cake layer on a supporting plate by revolving the supporting plate while maintaining the peripheral edge of the plate relative to one or the other of the measuring means 46 and 48. Measuring means 46 is in the form of a channel-like member that is fastened vertically on the innermost side 44 of the vertical column 22. This channel member 46 has a lower flange 50, a vertical plate 52, and an upper flange 54. Both the lower flange 50 and the upper flange 54 are welded or otherwise attached to the innermost side 44 of the vertical column 22.

The second offset measuring means 48 is in the form of a movable ring member of generally rectangular configuration which is captured on the channel member 46 and is movable between a lowered measuring position, as shown in FIG. 3, and a raised stowed position, as shown in FIG. 1. The horizontal width of the channel 46 is about one inch, while the horizontal width of the movable ring member 48 is about one-half of an inch. If the cake decorator wants to center a cake layer on a support plate leaving a one-inch ledge, then the offset measuring means 46 would be used, and the support plate would be placed with its peripheral edge against the innermost side 44 of the vertical column 22 so that the channel member 46 would represent a one-inch overhang over the peripheral edge of the support plate, and the cake layer would be brought up against the vertical plate 52 of the channel.

It the cake decorator wanted to leave only a one-half inch ledge on the support plate for the cake layer, then the second offset measuring means 48, in the from of the movable ring, would be used. This ring 48 would be lowered into the position shown in FIG. 3, and then the peripheral edge of the support plate of the cake layer would be brought against this ring member so that the difference in thickness between the ring 48 and the channel 46 would create a one-half inch ledge surrounding the cake layer on the support plate.

Figure 4:
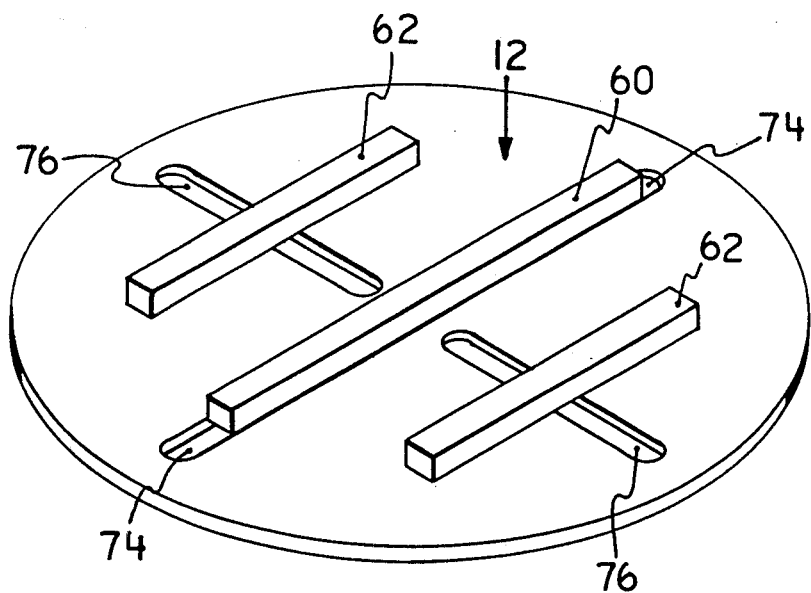
FIG. 4 is an inverted perspective view of a centering platform showing the nature of the underside of the platform, since the upperside of the platform has already been illustrated in FIG. 1.

The centering platform 12 is generally of flat circular shape. FIG. 4 shows this platform in an inverted position, and there is a diagonal indexing means 60 in the form of an elongated tongue which extends across the platform for nearly its entire width. This elongated tongue 60 is adapted to slip between the lower support rails 14 within the elongated slot 16 when the centering platform 12 is positioned over these lower support rails, as is shown in FIG. 1.

This centering platform 12 is also provided with stabilizing support means 62 in the form of secondary elongated tongues which are generally parallel with the diagonal tongue 60 but positioned more toward the periphery of the underside of the platform 12.

Figures 6, 7:
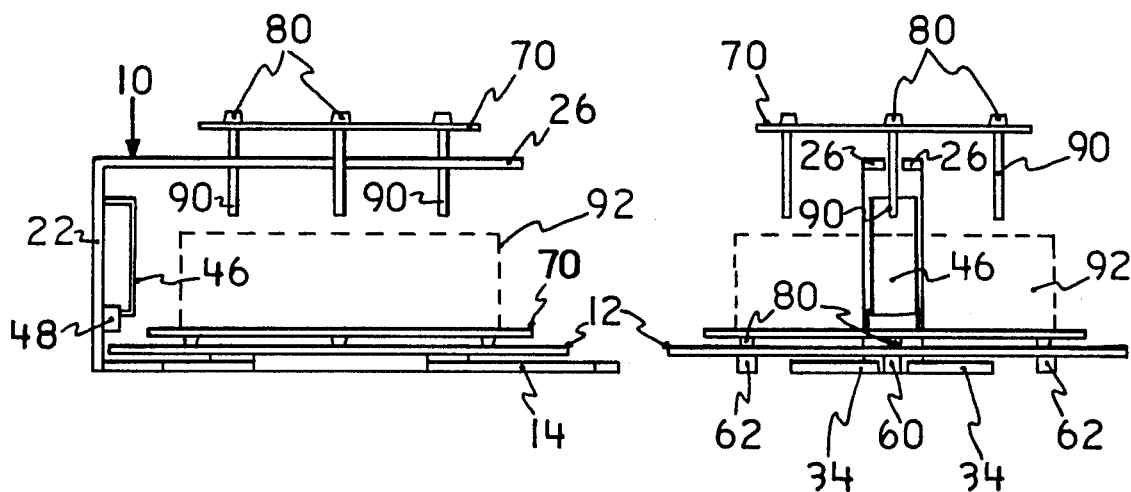
FIG. 6 is a front elevational view of the combination of the cake tier aligner with the centering platform installed therein, as depicted in FIG. 1, where the centering platform is supporting a cake layer support plate that is centered on the platform with its cake layer. An upper cake layer plate is also illustrated in FIG. 6 in a momentary raised position and having a series of spaced support posts extending downwardly therefrom, where two of the support posts are captured between the upper pair of parallel guide rails of the aligner, and before this upper plate is lowered into the top surface of the cake layer.
FIG. 7 is a left side elevational view of the combined aligner and platform of FIG. 6.

Turning to FIG. 6, which shows a front elevational view of the combination of the cake tier aligner 10 with the centering platform 12 installed therein, it is clear that both the height of the diagonal tongue 60 and the two stabilizing tongues 62 are higher than the thickness of the lower support rails 14 so that, in effect, the centering platform 12 is raised above the top of these lower support rails 14 so that it is possible to slide the aligner 10 out from under the centering platform without interference from the platform.

Turning back to a consideration of FIG. 1, the top surface of the centering platform 12 is provided with a plurality of concentric measured indicia 66 which extends outwardly from the center 68 of the platform so that the various size cake layers can be positioned on this platform in a centered position leaving a uniform ledge around the periphery of the platform. Actually, the cake layer will be on a cake support plate, such as plate 70 of FIG. 5, rather than being positioned directly on the top surface of the centering platform 12. Thus, it would be the cake support plate that would be centered within the concentric rings 66 of the platform.

Two series of diagonal depressions 74 and 76 are formed in the top side of the platform. One series of depressions 74 is arranged generally over the diagonal indexing means 60, while the second series of depressions 76 is arranged generally peripendicular to the first series and in line with the center point 68 of the platform, as is clearly illustrated in FIG. 1.

Figure 2:
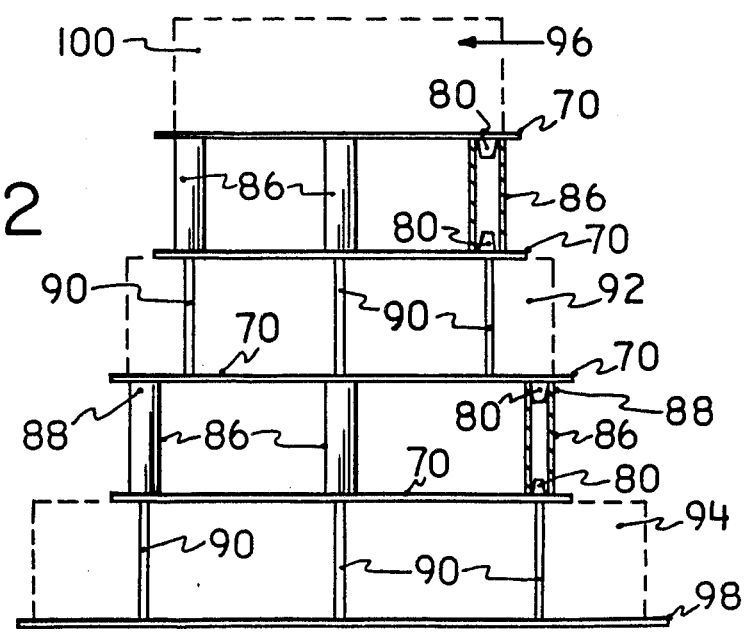
FIG. 2 is a schematic diagram of a wedding cake showing three cake layers supported in an elevated position and separated by ornamental posts that interlock with cake layer support plates.
Figure 5:
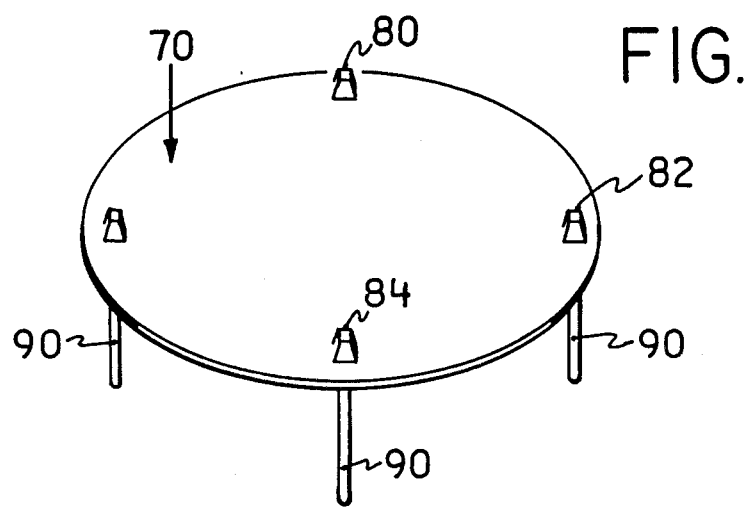
FIG. 5 is a top perspective view of a standard cake layer support plate being provided with sockets for receiving the upper ends of the support posts that are adapted to become embedded in a cake layer.

Now, turning to a consideration of the thin plastic cake layer support plate 70 of FIG. 5, it is of circular shape, and they come in various diameters, and they are standard bakery accessories that have been available for years and have been used for years by bakers and cake decorators in constructing wedding cakes with multiple tiers. This standard cake layer separator plate 70 is provided with a series of four radially spaced hollow plugs 80 on its top side, and they are equally spaced from each other and arranged near the periphery 82 of this plate 70. Each hollow plug 80 is of tapered pyramidal shape, with the top removed to have a flat top surface 84. Each hollow pyramidal plug 80 is adapted to receive, with a locking engagement, one end of a hollow ornamental post 86, as it best seen in FIG. 2. Thus, a single cake separate plate 70 may accommodate four ornamental posts 86 on its top side, and the top ends 88 of a series of hollow ornamental posts are adapted to receive the four hollow plugs 80 of an inverted cake separator plate 70, again, as seen in FIG. 2.

Going back to FIG. 5, the cake separator plate 70 also accommodates, on its underside, a plurality of support posts 90, where each single support post 90 is capable of a locking engagement into the interior of the hollow plug 80 from the underside of the separator plate 70.

Looking at both FIGS. 6 and 7, the cake separator plate 70 of FIG. 5 has been positioned with two of its support posts 90 captured within the elongated slot 28 of the upper pair of parallel guide rails 26, and the measured indicia 38 is designed to make it possible to locate the two support posts 90 that are within this elongated slot so that the center of this separator plate 70 will overlie the center point 40 of the aligner 10 which, in turn, is aligned with the center point 68 of the centering platform 12, as clearly illustrated in FIG. 1. A cake layer 92 is shown in dotted lines in both FIGS. 6 and 7, and this cake layer is supported on a cake separator plate 70, where the four hollow plugs 80 are positioned on the underside. In other words, the cake separator plate 70 of FIG. 5, without the four support posts 90, has been inverted from the position of FIG. 5 to the position shown in both FIGS. 6 and 7. The four hollow plugs 80 will slip down into the two series of depressions 74 and 76 in the centering platform 12, and this will naturally center this cake separator plate 70 relative to the centering platform 12. Thus, with the cake separator plate 70 with its four support posts 90 arranged within the upper pair of parallel guide rails, as shown in both FIGS. 6 and 7, it is time for the cake decorator to lower this cake separator plate 70 until the four support posts 90 are pressed into the top surface of the cake layer 92 and are forced downwardly into the cake. Once these four support posts 90 are firmly embedded in the cake layer, then the cake tier aligner 10 would be withdrawn from under and over the centering platform 12 without interference from the platform or from the cake separator plate 70 and its four support posts 90. Once the aligner 10 has been clearly set aside, then the decorator would force the top separator plate 70 down onto the top surface of the cake layer 92. This cake layer 92 is the middle tier of the wedding cake that is shown schematically in FIG. 2.

The bottom layer 94 of the wedding cake may be placed on a simple heavy cardboard mount 98 of circular shape. The illustrated example of the present invention appearing in FIG. 1 can accommodate all cake diameters from 6 inches through 16 inches, but it will be understood that larger diameter cakes could be accommodated by merely enlarging the dimensions of the invention. This bottom cake layer 94 would be centered on the cardboard mount 98, and the offset measuring means, or spacer means, 46 and 48 could be employed for ensuring that the cake layer is centered on this mount 98 leaving a uniform ledge of either one inch when using the spacer 46 and a one-half inch ledge when using the spacer ring 48. Then this bottom cake layer 94 and its cardboard mount 98 would be positioned on the centering platform 12, and the platform 12 would be installed within the cake tier aligner 10 with the diagonal indexing means, or elongated tongue, 60 captured within the elongated slot 16 formed by the lower pair of parallel support rails 14. Then it would be time to install the top separator plate 70 with its four support posts 90 within the cake tier aligner, as depicted in FIGS. 6 and 7, until the support posts 90 are lowered into the top surface of the bottom cake 94 so that the posts will not move from that position. Then the cake tier aligner would be withdrawn from under and over the centering platform 12, and then the cake decorator would lower this top separator plate 70 so that the four support posts 90 would become completely embedded within the bottom cake layer 94, and the lower tip of each support post would touch the cardboard mount 98, as seen in FIG. 2.

Usually, the cake decorator will put the final touches of the wedding cake 96 at the scene of the wedding reception. Thus, elements of the cake will be transported in a station wagon or van in cardboard boxes so that injury will not damage the cake and render it catastrophic, or a total loss. The bottom cake layer 94 could be provided with its bottom cardboard mount 98 and its top separator plate 70 back at the bakery, and then put into a cardboard cake box. The middle cake 92 could be provided with both its lower cake separator plate 70 as well as the top cake separator plate 70 back at the bakery. Lastly, the top cake layer 100 could be provided with its lower cake separator plate 70 back at the bakery and then placed in a cardboard box for transportation. Once the cake decorator arrived at the reception, then the wedding cake 96 could be constructed by first installing the four ornamental posts 86 to the hollow plugs 80 on the top side of the separator plate 70 that is positioned on the top surface of the bottom cake 94. Then the middle tier 92, with its lower separator plate 70 in place, would be positioned with its four hollow plugs telescoped into the top ends 88 of the four ornamental posts 86. Next, the top separator plate 70, at the top of the middle tier 92, would be provided with four ornamental posts 86, and then the top layer 100, with its bottom separator plate 70, would be positioned with the four hollow plugs 80 telescoped into the top ends 88 of the ornamental posts 86.

In the past, some cake decorators had a problem aligning and centering the cake tiers and posts of a multiple tier wedding cake. Frequently, the cake separator plates 70 would be placed off center and the separator plates would be twisted, or misaligned, relative to separator plates below and above a given separator plate so that it would be a rate occasion to have a straight in-line cake stacking.

The present cake tier aligner 10 could be made of aluminum bar stock and provided with measured indicia for various size top separator plates 70. The lower parallel support rails 14 provide a positive locking system for indexing relative to the centering platform 12, and, in turn, the centering platform provides a positive locking, or indexing, system for the bottom separator plates of all middle tier cakes. The centering platform may be made of plywood, or plastic, or a similar material.

Modifications of this invention will occur to those skilled in this art. Therefore, it is to be understood that this invention is not limited to the particular embodiments disclosed but that it is intended to cover all modifications which are within the true spirit and scope of this invention as claimed.

What is claimed is:
1. The combination of a wedding cake tier aligner and a separate centering platform for use in arranging the cake layers on a common central vertical axis, said combination comprising:
   a. a cake tier aligner having a lower pair of parallel support rails, a vertical column rising at one end of the parallel rails, and an upper pair of parallel guide rails supported from the upper end of the vertical column directly over and generally parallel to the lower support rails;
   b. the lower rails having side stabilizing means, while at least one of the upper guide rails includes measured indicia;
   c. a centering platform for supporting a cake layer and being of generally flat circular shape with a diagonal indexing means on its underside which is adapted to slip between the lower support rails when the centering platform is positioned over the lower support rails;
   d. the upper surface of the centering platform having a plurality of concentric measured indicia extending from the center of the platform, and two series of depressions formed in the platform and arranged diagonally of the platform, one series of depressions being arranged generally over the said diagonal indexing means, while the second series of de- pressions is arranged generally perpendicular to the first series.

2. The invention as recited in claim 1 wherein the said centering platform is provided with stabilizing support means on its underside that serves to support the centering platform from a supporting surface independent of the cake tier aligner.

3. The invention as recited in claim 2 wherein the said stabilizing support means of the centering platform are arranged outside of the stabilizing means of the lower support rails of the cake tier aligner that are remote from the said vertical column so that the aligner may be separated horizontally from under and over the centering platform without interference from the centering platform.

4. The invention as recited in claim 3 wherein the support column of the cake tier aligner is provided on its innermost side with offset measuring means adapted to assist in centering a cake on a supporting plate by revolving the supporting plate while maintaining the peripheral edge of the plate relative to the measuring means.

5. The invention as recited in claim 4 wherein the said offset measuring means comprises a channel-like member fastened vertically on the inner side of the support column.

6. The invention as recited in claim 5 wherein the channel-like member is provided with a movable ring member that is captured on the channel member and is movable between a lowered measuring position and a raised stowed position, the thickness of the ring member being about one-half the thickness as the thickness of the channel member.

7. The invention as recited in claim 1 wherein the length of the lower support rails and the length of the upper guide rails of the cake tier aligner are greater than the diameter of the centering platform.

8. The invention as recited in claim 1 wherein the said measured indicia of the upper guide rails of the aligner is measured outwardly from an imaginary center of the guide rails which is in turn vertically aligned with the imaginary center of the centering platform when one side edge of the platform bears against the vertical column.

9. The subcombination of a wedding cake tier aligner having a lower pair of parallel support rails, a vertical column rising at one end of the parallel rails, and an upper pair of parallel guide rails supported from the upper end of the vertical column directly over and generally parallel to the lower support rails, the lower support rails having side stabilizing means, while at least one of the upper guide rails includes measured indicia.

10. The subcombination as recited in claim 9 wherein the support column of the cake tier aligner is provided on its innermost side with offset measuring means adapted to assist in centering a cake on a supporting plate.

11. The subcombination of claim 10 wherein the channel-like member is provided with a movable ring member that is captured on the channel member and is movable between a lowered measuring position and a raised stowed position, the thickness of the ring member being about one-half the thickness as the thickness of the channel member.

12. The subcombination of a centering platform for use in arranging the tiers of a wedding cake on a common central vertical axis, said centering platform comprising a generally flat circular shape with a diagonal indexing means on its underside, the upper surface of the centering platform having a plurality of concentric measured indicia extending outwardly from the center of the platform, and two series of depressions formed in the platform and arranged diagonally of the platform, one series of depressions being arranged generally over the said diagonal indexing means, while the second series of depressions is arranged generally perpendicular to the first series.

13. The subcombination of claim 12 wherein the said centering platform is provided with stabilizing support means on its underside that serves to support the centering platform from a supporting surface, said stabilizing support means being positioned adjacent the periphery of the platform and being generally symmetrical about the imaginary vertical center of the platform.

* * * * *